US008677907B2

(12) United States Patent
Graaff et al.

(10) Patent No.: US 8,677,907 B2
(45) Date of Patent: Mar. 25, 2014

(54) BIMODAL CONTAINER CHASSIS

(75) Inventors: Wolfgang Graaff, Auburndale, MA (US); Marieno P. Graveland, Lexmond (NL); Michael W. DiLuigi, Alpharetta, GA (US); Gary L. Fenton, Edgerton, WI (US); Thomas J. Draxler, Deerfield, WI (US)

(73) Assignee: RailRunner, N.A., Inc., Lexington, MA (US)

( * ) Notice: Subject to any disclaimer, the term of this patent is extended or adjusted under 35 U.S.C. 154(b) by 0 days.

(21) Appl. No.: 13/491,109

(22) Filed: Jun. 7, 2012

(65) Prior Publication Data

US 2012/0240814 A1 Sep. 27, 2012

Related U.S. Application Data

(62) Division of application No. 12/519,963, filed as application No. PCT/US2007/088288 on Dec. 20, 2007, now Pat. No. 8,215,240.

(60) Provisional application No. 60/871,075, filed on Dec. 20, 2006.

(51) Int. Cl.
*B61D 17/00* (2006.01)
(52) U.S. Cl.
USPC .......................... 105/4.1; 105/4.2; 105/215.2
(58) Field of Classification Search
USPC ........ 105/404, 406.1, 409, 411, 215.1, 215.2, 105/4.1, 4.2, 4.3; 296/182.1, 183.1, 186.1
See application file for complete search history.

(56) References Cited

U.S. PATENT DOCUMENTS

| 2,709,969 | A | * | 6/1955 | Andert | 410/53 |
| 2,837,037 | A | * | 6/1958 | Holmberg | 410/65 |
| 3,057,306 | A | * | 10/1962 | Hatfield | 105/159 |
| 4,817,537 | A | * | 4/1989 | Cripe et al. | 105/404 |
| 4,869,177 | A | * | 9/1989 | Mangone | 105/42 |
| 4,922,832 | A | * | 5/1990 | Lienard et al. | 105/4.2 |
| 4,955,292 | A | * | 9/1990 | Cripe | 105/4.2 |
| 4,981,083 | A | | 1/1991 | Cripe | |

(Continued)

FOREIGN PATENT DOCUMENTS

| CL | 32501 | 3/1981 |
| DE | 1 235 977 | 9/1967 |

(Continued)

OTHER PUBLICATIONS

U.S. Appl. No. 12/519,963, filed Apr. 30, 2010.

*Primary Examiner* — Jason C Smith
(74) *Attorney, Agent, or Firm* — Leydig, Voit & Mayer, Ltd.

(57) ABSTRACT

A bimodal container chassis for supporting a container during roadway and railway transit includes a mainframe having first and second ends, a top edge and a bottom angled edge. The bottom angled edge is positioned at an angle from horizontal. A running gear attachment is connected to the mainframe and slidable along the bottom angled edge in first and second directions between an over-the-road position and an over-the-rail position. The first direction is upward and toward the first end and the second direction is downward and toward the second end such that the running gear attachment is disposed adjacent the second end when in the over-the-road position and disposed upward relative to the over-the-road position and toward the first end when in the over-the-rail position.

20 Claims, 10 Drawing Sheets

(56) References Cited

U.S. PATENT DOCUMENTS

| | | | |
|---|---|---|---|
| 5,020,445 A | 6/1991 | Adams, Jr. | |
| 5,040,466 A * | 8/1991 | Wicks et al. | 105/4.3 |
| 5,167,190 A | 12/1992 | Galand | |
| 5,220,870 A * | 6/1993 | Larson | 105/159 |
| 5,431,110 A * | 7/1995 | Adams, Jr. | 105/4.1 |
| 5,537,931 A * | 7/1996 | Donkin | 105/159 |
| 5,826,517 A * | 10/1998 | Larson et al. | 105/4.3 |
| 5,890,433 A | 4/1999 | Wicks | |
| 6,050,197 A * | 4/2000 | Wicks | 105/4.2 |
| 6,575,101 B2 * | 6/2003 | Blute et al. | 105/215.2 |
| 2004/0089192 A1* | 5/2004 | Jacob | 105/215.2 |
| 2005/0166787 A1* | 8/2005 | Astrom | 105/215.1 |
| 2006/0288902 A1* | 12/2006 | McGuire | 105/215.2 |
| 2008/0105159 A1* | 5/2008 | Lombardo | 105/215.2 |
| 2010/0199879 A1* | 8/2010 | Graaff et al. | 105/215.2 |
| 2010/0242787 A1* | 9/2010 | Wicks et al. | 105/4.4 |

FOREIGN PATENT DOCUMENTS

| | | |
|---|---|---|
| DE | 1 455 169 | 9/1971 |
| DE | 33 44 513 A1 | 6/1985 |
| DE | 38 06 260 A1 | 9/1988 |
| DE | 91 05 054.5 U1 | 7/1991 |
| DE | 300 359 A5 | 6/1992 |
| DE | 92 07 500.2 U1 | 9/1992 |
| DE | 36 18 304 C2 | 4/1994 |
| DE | 43 38 299 A1 | 6/1994 |
| DE | 195 15 109 A1 | 10/1996 |
| DE | 195 15 110 A1 | 10/1996 |
| DE | 39 39 384 C2 | 1/1997 |
| DE | 34 45 741 C2 | 1/1998 |
| DE | 101 45 330 A1 | 4/2003 |
| DE | 195 16 709 B4 | 8/2005 |
| DE | 10 2004 040 245 A1 | 2/2006 |
| EP | 0 362 187 A1 | 4/1990 |
| EP | 0 401 102 A1 | 12/1990 |
| EP | 0 143 614 B1 | 7/1991 |
| EP | 0 320 420 B1 | 5/1992 |
| EP | 0 265 398 B1 | 8/1993 |
| EP | 0 328 852 B1 | 12/1993 |
| EP | 0 440 571 B1 | 7/1994 |
| EP | 0 517 507 B1 | 8/1995 |
| EP | 0 574 130 B1 | 10/1995 |
| EP | 0 494 323 B1 | 5/1996 |
| EP | 0 642 428 B1 | 8/1997 |
| EP | 0 856 449 A1 | 8/1998 |
| EP | 0 736 435 B1 | 12/2000 |
| EP | 0 783 423 B1 | 12/2001 |
| EP | 1 145 928 B1 | 10/2005 |
| EP | 1 623 851 A1 | 2/2006 |
| WO | WO 90/14978 A1 | 12/1990 |
| WO | WO 92/06878 A1 | 4/1992 |
| WO | WO 97/05005 A1 | 2/1997 |
| WO | WO 00/54995 A1 | 9/2000 |
| WO | WO 01/17836 A1 | 3/2001 |

* cited by examiner

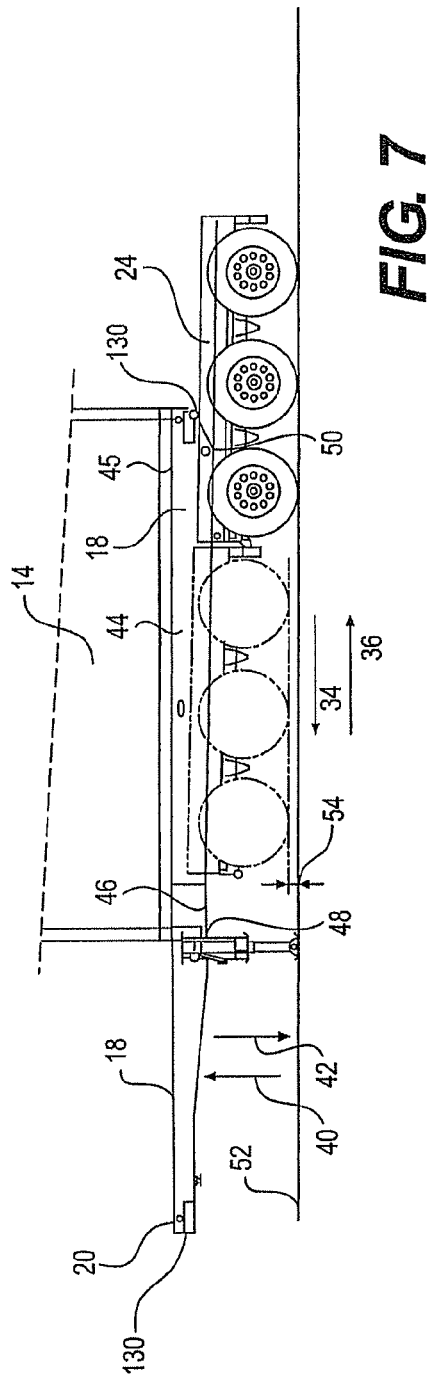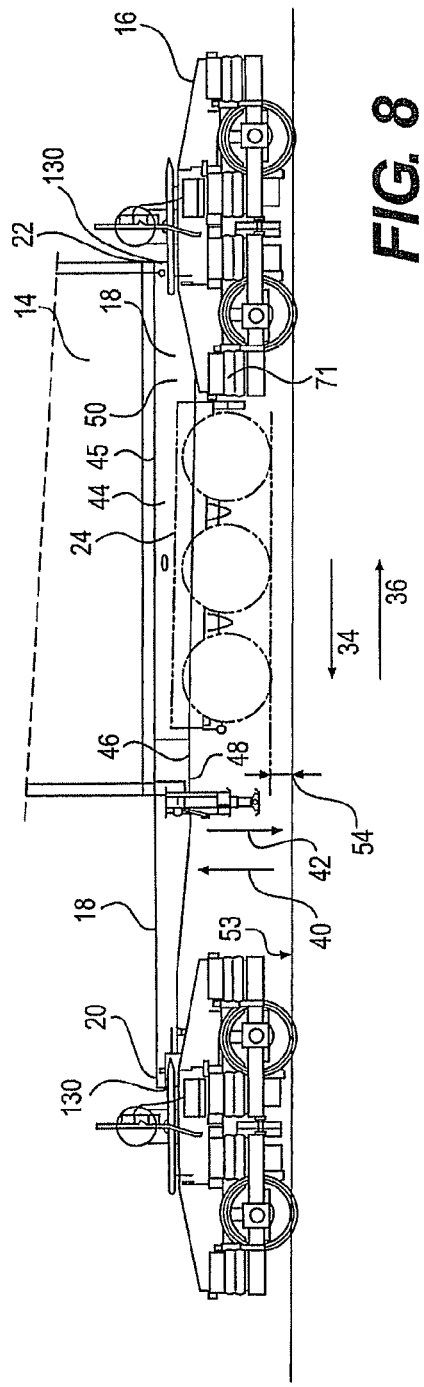

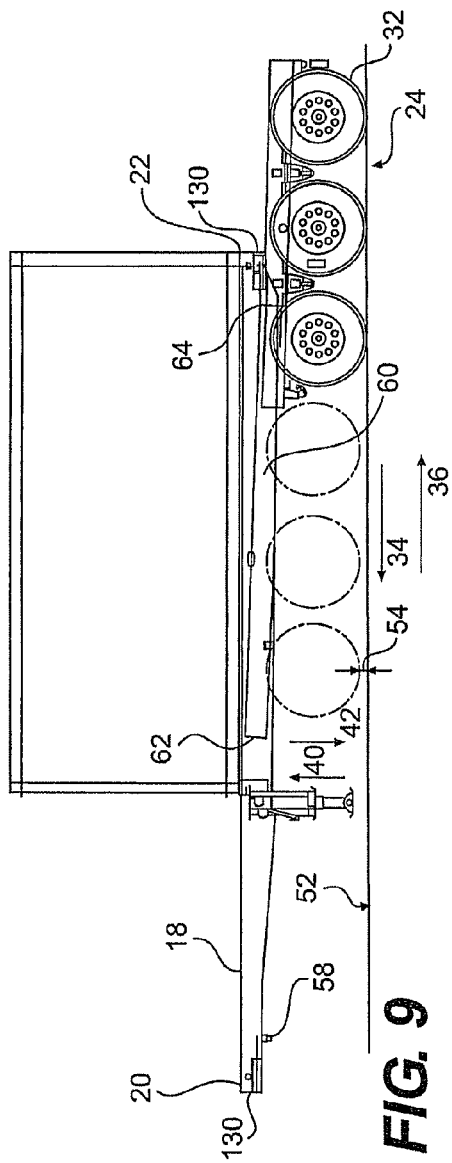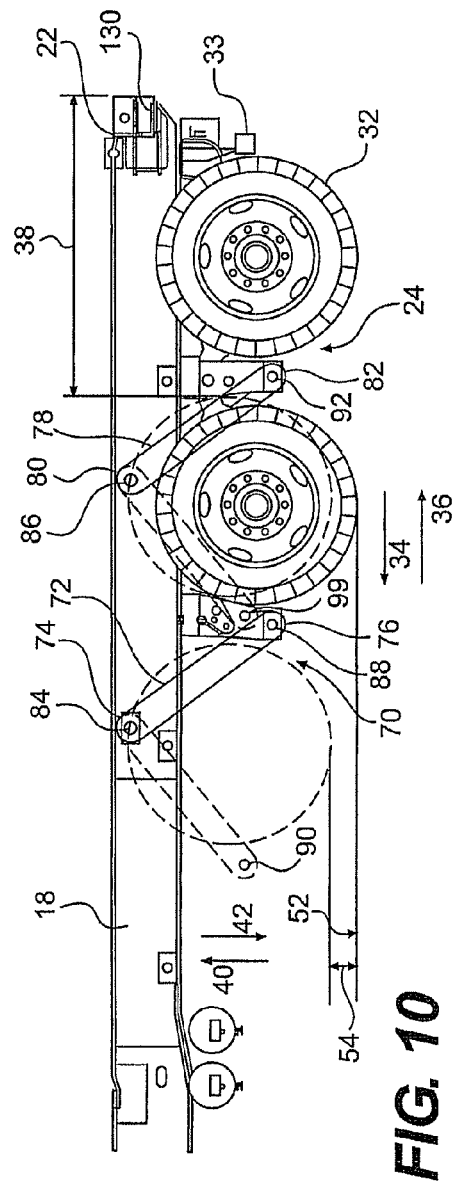

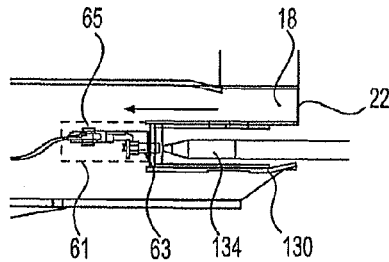
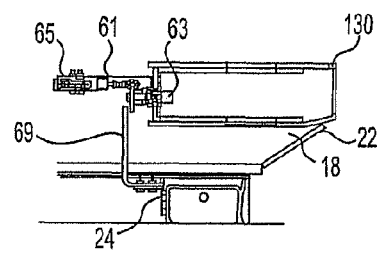
FIG. 11    FIG. 12
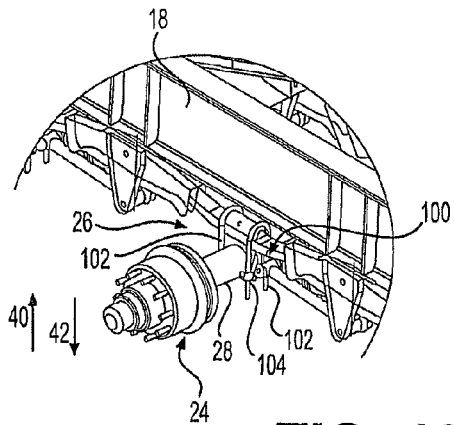
FIG. 13
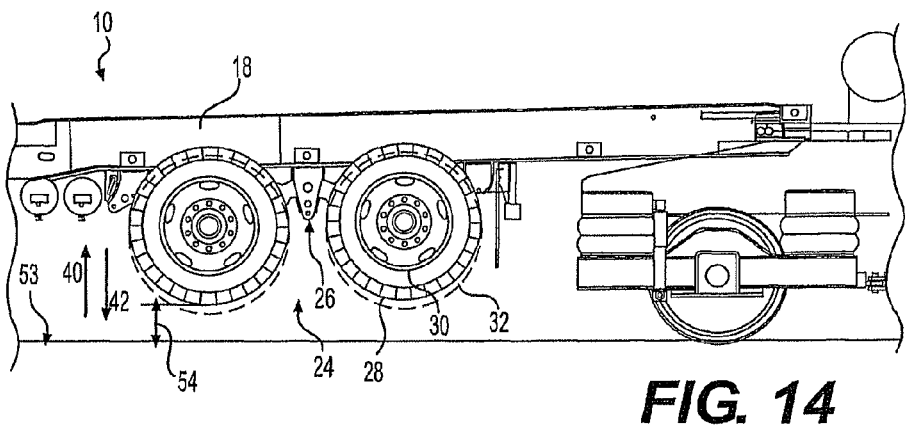
FIG. 14

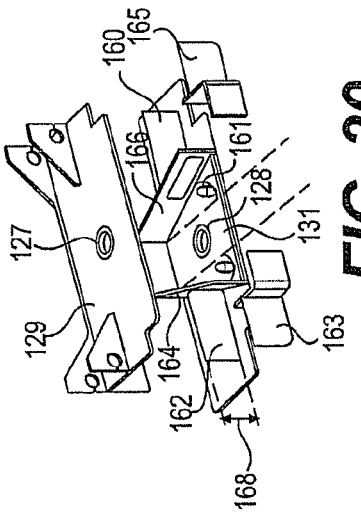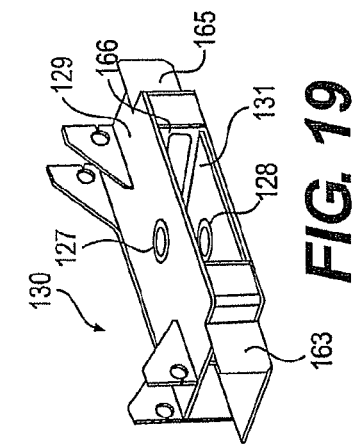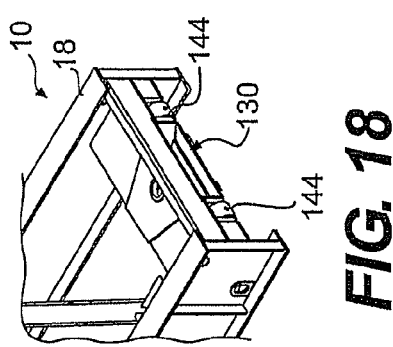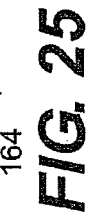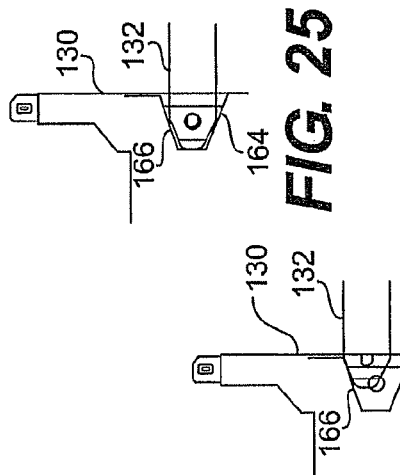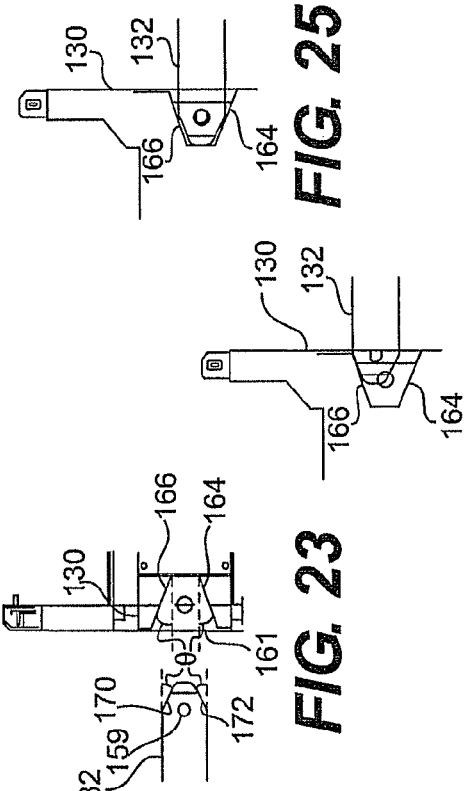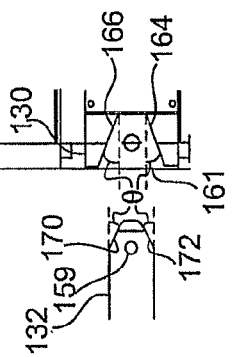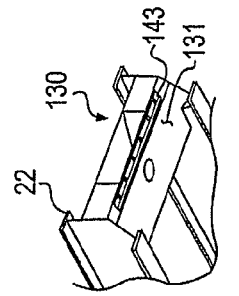

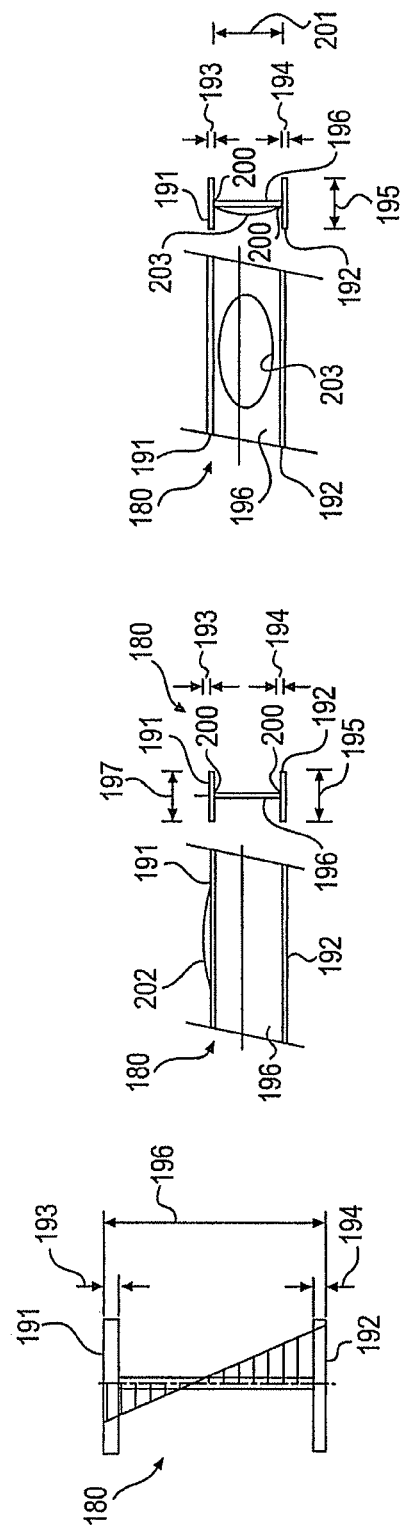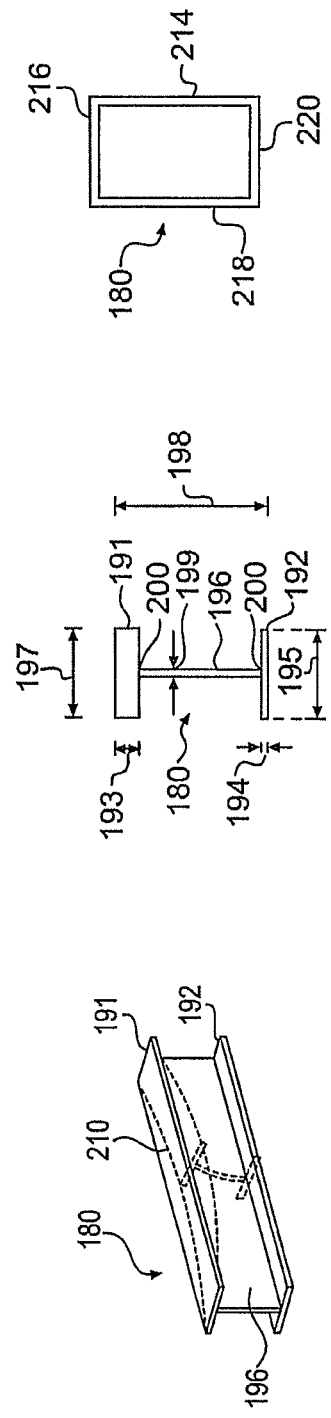

BIMODAL CONTAINER CHASSIS

CROSS-REFERENCE TO RELATED APPLICATIONS

This patent application is a divisional of U.S. patent application Ser. No. 12/519,963, which was filed on, Apr. 30, 2010, and which is incorporated herein in its entirety by reference.

BACKGROUND

Known bimodal trailers and semi-trailers include framework and attached bogies for transporting cargo during highway and railway transit. These bimodal trailers and semi-trailers face the logistical difficulty of supplying sufficient cargo in both transport modes. For example, these bimodal trailers and semi-trailers are limited to closed-loop operations in order to balance trailers and bogies for both operations. Such limitations have reduced the country-wide use of the bimodal technology. Accordingly, it would be desirable to extend the use of such technology to other intermodal applications.

Regular container transport over the highway is often done with standard container chassis. These standard container chassis are skeleton frames having rear and front bolsters equipped locking devices for securing the container. The front end of these standard container chassis has a king-pin installed, and the rear end of these standard container chassis has a simple running gear with spring suspension, axles and brakes installed. These standard chassis have permanently fixed suspensions and are available only in twenty foot or fifty-three foot configurations. The suspensions of these standard container chassis is a horizontal sliding design for complying with bridge laws. These standard container chassis are light weight for maximizing payloads but have no technical capability for use in rail operations. Accordingly, it would be desirable to provide a container chassis with bimodal capabilities, thereby expanding the use of container chassis as well as bimodal technology.

For highway transit, known bimodal trailers generally have a front end for connecting to a tractor and a rear end equipped running gear. These bimodal trailers can be connected to, and pulled behind, a tractor while their running gear contacts and traverses the highway. For railway transit, these bimodal trailers generally have a female connector on the front end and a male connector on the rear end, both connectors are for connecting to a respective connector of a rail bogie. When in rail-use, these bimodal trailers are connected to, and suspended between bogies such that no part of the bimodal trailer contacts the railway track. This is normally achieved by applying installed lift-axles, which are activated by air hydraulics supplied from a tractor. Such air-ride axles are significantly more expensive than spring suspension and also have a greater weight. Moreover, the raised suspension has to be safely secured in the upper position for preventing an accidental lowering of the same, which can cause accidents while in rail operation. This securing process requires expensive components and is time consuming because every gear has to be controlled and checked prior to train departure. Accordingly, it would be desirable to provide a bimodal trailer and container chassis that does not require an air-lifting and securing of the same. In addition it would be desirable to provide a bimodal trailer and container chassis operationally suitable in both highway and railway transit while complying with relevant highway and railway laws, rules, and regulations.

BRIEF SUMMARY

A bimodal container chassis is provided for supporting containers and other cargo during highway and railway transit. In an embodiment, the bimodal container chassis of the present disclosure includes a mainframe having first and second ends and top and bottom edges. The bottom edge is positioned at an angle from horizontal. This chassis also has a running gear attachment connected to the mainframe that moves along the bottom edge in first and second directions. The first direction is upward and toward the first end, and the second direction is downward and toward the second end. When transitioning between an over-the-road position and an over-the-rail position, the running gear moves along the tapered bottom edge of the mainframe in first and second directions. According to an aspect, the running gear attachment moves in the first direction to an over-the-rail position for rail transit and in the second direction to an over-the-road position for road transit. The over-the-rail position is characterized by a gap between the tires of the running gear attachment and the railway and a clearance under the mainframe at the second end. The mainframe connects to a bogie at the clearance for supporting the chassis during railway transit. The over-the-road position is characterized by the tire being in contact with the roadway and the running gear attachment being located at the second end of the mainframe for supporting the chassis during roadway transit.

BRIEF DESCRIPTION OF THE SEVERAL VIEWS OF THE DRAWINGS

FIG. 7 is a side view of an embodiment of the bimodal container chassis having a tapered-beam mainframe transporting a container in over-the-road operation.

FIG. 8 is a side view of an embodiment of the bimodal container chassis having a tapered-beam mainframe transporting a container in over-the-rail operation.

FIG. 9 is a side view of an embodiment of the bimodal container chassis having a straight-beam mainframe including a slider attachment.

FIG. 10 is a fragmentary side view of an embodiment of the bimodal container chassis having straight-beam mainframe including a swinging slider.

FIG. 11 is a section side view of an air-activated locking pin.

FIG. 12 is another section side view of the air-activated locking pin of FIG. 11.

FIG. 13 is a fragmentary perspective view of an embodiment of the bimodal container chassis including a device for preventing decompression of suspension components.

FIG. 14 is a fragmentary side view of an embodiment of the bimodal container chassis including the device for preventing decompression of suspension components of FIG. 13.

FIG. 18 is a fragmentary perspective view of an embodiment of the bimodal container chassis including a receiver box incorporated therein.

FIG. 19 is a perspective view of a receiver box for use with an embodiment of the bimodal container chassis.

FIG. 20 is a perspective view of a partially assembled receiver box for use with an embodiment of the bimodal container chassis.

FIG. 21 is a perspective view of an embodiment of the bimodal container chassis having a receiver box equipped with a sliding pad.

FIG. 22 is a section side view of the sliding pad of FIG. 21 secured to the receiver box by a recessed screw.

FIG. 23 is a top view of the tongue of a bogie separated from a receiver box of an embodiment of the bimodal container chassis.

FIG. 24 is a top view of the tongue of the bogie partially engaged with the receiver box of FIG. 23.

FIG. 25 is a top view of the tongue of the bogie engaged with the receiver box of FIG. 23.

FIG. 31 is a cross-section view of an I-beam for use in a mainframe of an embodiment of the bimodal container chassis.

FIG. 32 is a cross-section view and a fragmentary side view illustrating flange buckling in an I-beam for use in a mainframe of an embodiment of the bimodal container chassis.

FIG. 33 a cross-section view and a fragmentary side view illustrating web buckling in an I-beam for use in a mainframe of an embodiment of the bimodal container chassis.

FIG. 34 is a fragmentary perspective view illustrating tip buckling in an I-beam for use in a mainframe of an embodiment of the bimodal container chassis.

FIG. 35 is a cross-sectional view of an asymmetrical I-beam for use in a mainframe of an embodiment of the bimodal container chassis.

FIG. 36 is a cross-sectional view of a hollow beam for use in a mainframe of an embodiment of the bimodal container chassis.

DETAILED DESCRIPTION

Figure 1:
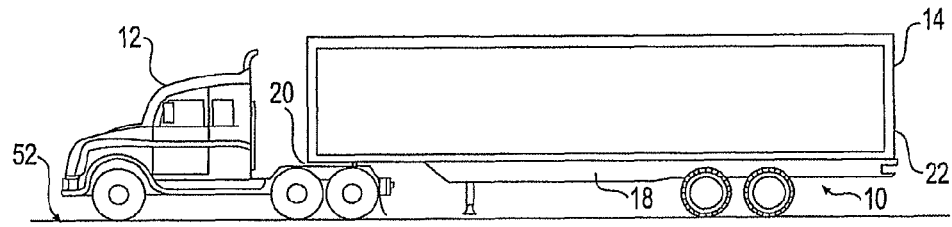
FIG. 1 is a side view of an embodiment of the bimodal container chassis transporting a container in over-the-road operation.
Figure 2:
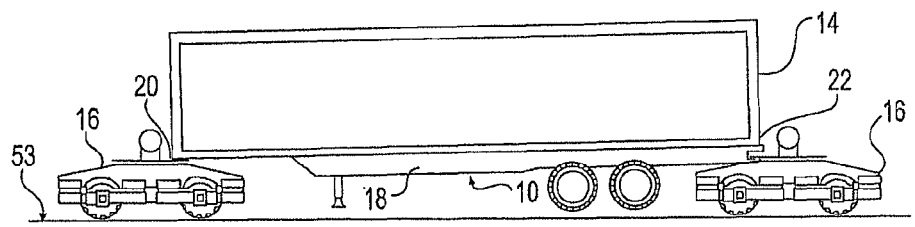
FIG. 2 is a side view of an embodiment of the bimodal container chassis transporting a container in over-the-rail operation.

Turning now to the drawings, there is shown in FIG. 1, a bimodal container chassis 10 connected to a tractor 12 for transporting a container 14 over the road 52. FIG. 2 shows the chassis 10 connected to, and suspended between, rail bogies 16 for transporting the container 14 over railway track 53. As shown in FIGS. 1 and 2, the chassis 10 includes a mainframe 18 having first and second ends 20, 22. The mainframe 18 can be constructed of any material known in the art to be suitable, including, but not limit to, high tension steel such as T1, StE690, or Weldox 700 having a yield stress of 100 ksi or 690 mpa.

Figure 3:
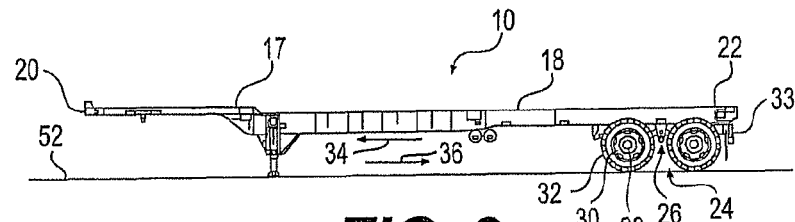
FIG. 3 is a side view of an embodiment of the bimodal container chassis unloaded and having a gooseneck mainframe with running gear in contact with a road surface.

As shown in FIG. 3, a running gear attachment 24 is disposed near the second end 22 of the mainframe 18, which has a gooseneck 17. The gooseneck 17 is a common elevated main beam extension. The gooseneck extension provides the chassis with a first end 20 that is high enough to connect to a standard fifth wheel of a tractor. The rest of the chassis is low enough to the road to transport a container having a height of nine-and-one-half feet ("high cube container") without violating highway laws that limit the maximum height of a chassis, plus container, to thirteen-and-one-half feet. High-cube containers are equipped with a gooseneck tunnel recessed into the floor of the container.

Figure 4:
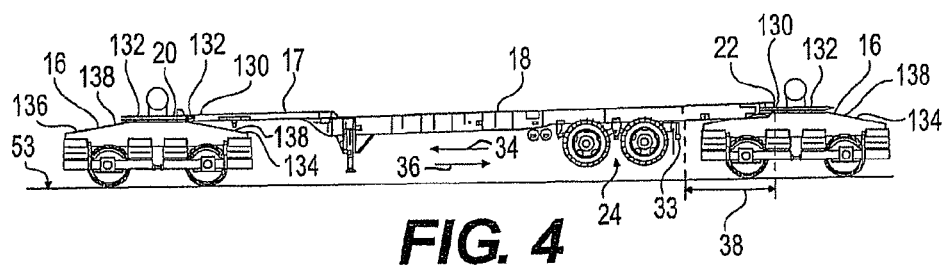
FIG. 4 is a side view of an embodiment of the bimodal container chassis having a gooseneck mainframe unloaded and suspended between bogies.

The running gear 24 can include, but is not limited to, braking components, suspension components 26, axles 28, wheels 30, and tires 32. The tires 32 of the running gear 24 contact the road 52 when the first end 20 of the mainframe 18 is connected to the tractor 12 for over-the-road operation. As shown in FIG. 4, the running gear 24 is suspended above the rail 53 when the first and second ends 20, 22 of the mainframe 18 are connected to rail bogies 16 for over-the-rail operation. The chassis of FIGS. 3 and 4 does not transfer pulling and compression forces in a straight line. Also, when this chassis is connected between bogies 16, as shown in FIG. 4, the mainframe 18 is positioned at an angle, which is not desirable. Due to this angle, cargo in the container may shift during transit.

The sliding running gear 24 is movable along a horizontal length of the mainframe 18 in directions 34 and 36 to provide a clearance 38 where the chassis 10 connects with the bogie 16 for over-the-rail operation. In an embodiment, the clearance 38 can be a defined clearance 38 of fifty inches or more. As shown in FIG. 3, the running gear 24 can be positioned proximate to the second end 22 of the mainframe 18 for over-the-road operation. And, as shown in FIG. 4, the running gear 24 can be moved in the direction 34 away from the second end 22 of the mainframe to create the clearance 38 where the chassis 10 connects with the bogie 16 for over-the-rail operation.

As shown in FIGS. 3 and 4, another aspect of the disclosure is a repositionable underride guard 33. Rules and regulations administered by the National Highway Traffic Safety Administration ("NHTSA"), which is part of the United States Department of Transportation, require that heavy trailers used in highway transit, such as the chassis 10, have a rear underride guard 33. By law the rear underside guard 33 must be positioned proximate to the rear end 22 of the chassis 10 to prevent an automobile from sliding beneath the chassis 10 in the event of a collision.

The underride guard 33 is movable along a horizontal length of the mainframe 18 between an over-the-road position, as shown in FIG. 3, and an over-the-rail position, as shown in FIG. 4. When in the over-the-road position, the underride guard 33, pursuant to law, is proximate to the rear end 22 of the mainframe 18 of the chassis 10. When moving from the road position to the rail position, the underride guard 33 moves in the direction 34 toward the mid-point of the mainframe 18, thereby creating a clearance 38 proximate the rear end 22 of the chassis 10. The clearance 38 is necessary for connecting the chassis 10 to the bogie 16.

In an embodiment of the chassis 10, the underride guard 33 is connected to, and moves in tandem with, the running gear 24. In another embodiment, the underride guard 33 is not connected to, and moves independent of, the running gear 24.

Figure 5:
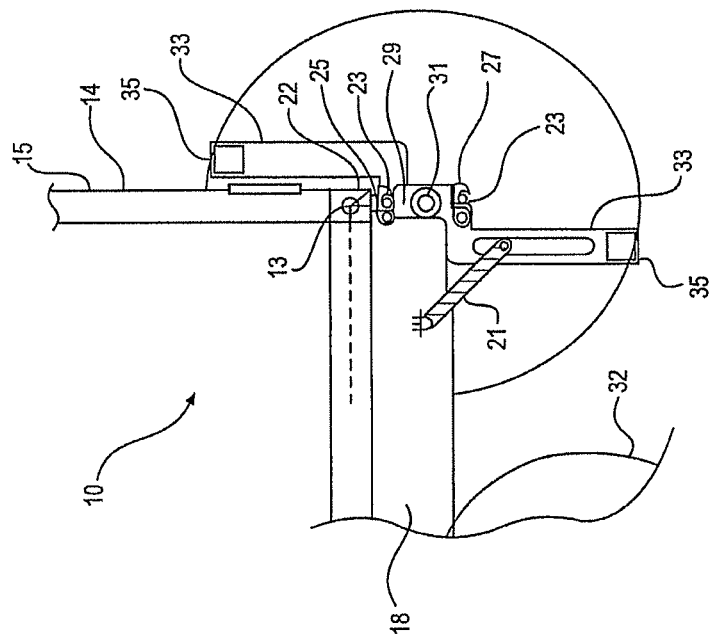
FIG. 5 is a fragmentary side view of an embodiment of the bimodal container chassis having a pivotally connected underride guard.

In another embodiment, as shown in FIG. 5, the underside guard 33 is pivotally connected to the chassis 10. The rear end 22 of the mainframe 18 includes a connecting pin 31 and first and gravity-operated latches 25, 27. The underride guard 33 has a fixed end 29, a free end 35, and a pin 23 configured to interact with the first and second gravity-operated latches 25, 27. The fixed end 29 of underride guard 33 is pivotally connected to the rear end 22 of the mainframe 18 via the pin 31. When transitioning between the over-the-road position and the over-the-rail position, the underride guard 33 rotates about the pin 31. When in the over-the-rail position, i.e., a position above the mainframe, the underride guard 33 is positioned substantially perpendicular to the mainframe 18 and the free end 35 is positioned above the fixed end 29. When in the over-the-road position, i.e., a position below the mainframe, the underride guard 33 is positioned substantially perpendicular to the mainframe 18 and the free end 35 is positioned below the fixed end 29.

As the underride guard 33 approaches the over-the-rail position, while transitioning from the over-the-road position, pin 23 contacts a curved portion of latch 25 causing latch 25 to rotate in a first direction. Pin 23 continues moving until the underride guard 33 achieves the over-the-rail position. Once the underride guard 33 achieves the rail position, gravity rotates latch 25 in a second, opposite, direction such that latch 25 connects to pin 23 of guard 33. Latch 25 and pin 23 secure the underride guard 33 in the rail position, and latch 25 must be manually disconnected from pin 23 before the guard 33 can transition to the road position. Latch 27 operates in the same manner as latch 25.

Latches 25, 27 are securable by a lock, and when latch 25 is locked, the underride guard 33 remains fixed in the over-the-rail position adjacent to the doors of the container 14, thereby preventing theft and tampering with cargo inside the container 14. A leaf spring may be provided to ensure that latches 25, 27 remain latched. A reinforcing bar 21 may be provided for supporting the underride guard in the position below the mainframe. The bar 21 may be removable and extends from the mainframe 18 to the underride guard 33.

Figure 6:
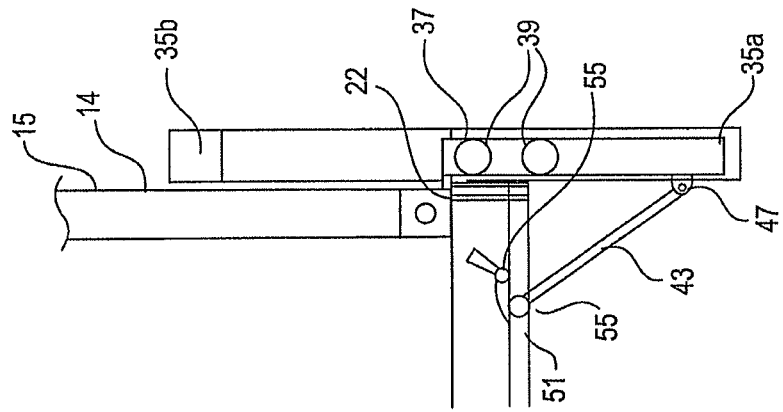
FIG. 6 is a fragmentary side view of an embodiment of the bimodal container chassis having a pivotally connected underride guard.

In yet another embodiment, as shown in FIG. 6, the running gear 24 is attached beyond the rear end 22 of the chassis 10. In this embodiment, instead of rotating about the pin 31, the underride guard 33 slides in a direction parallel to the rear edge 15 of the container 14 so that it is movable between the over-the-road position 35a and the over-the-rail position 35b thus clearing the way for the bogie 16 to connect with the chassis 10. The underride guard 33 is guided by a set of rollers 39 embedded in a fixture 37. The lower portion of the underside guard 35a is connected by a bar 43 to the chassis frame. At one end 47, the bar is fixed with a pin to the guard 33 and on the other end with a roller 49 to the chassis 10. The roller is located and moves within a guide 51 of mainframe 18, while the guard is being lifted up and out of the way. It should be appreciated that roller can be located on the bar 43 and the guide 51 can be located on the guard 33. In this case, the bar is fixed to the mainframe 18 and slides relative to the guard 33. While in the road position bar 43 is secured in guide 51, which is locked by a lever 55, thereby strengthening and stiffening the underride guard 33 against automobile impacts. When moving to the rail position, lever 55 is manually released allowing the sliding of the underside guard into the upper position 35b.

FIGS. 7-15 and 15-16 show a twenty-foot chassis 10, while previous FIGS. 3 and 4 show a forty-foot chassis 10 having a gooseneck. Twenty-foot containers 14 can carry the same load as a forty foot container 14, for example, 67,200 pounds as standardized by the International Standard Organization. A twenty foot chassis 10 is significantly shorter than a forty foot chassis 10, thus leading to a different configuration and height of its frame in relation to the road surface and rail track when connected to a bogie 16 as well as with the attachment of the running gear 24 in order to comply with the bridge laws. In this case, the sliding running gear 24 must extend behind the rear end 22 of the frame 18 and the container 14 to create a longer distance to the king-pin attachment. The sliding running gear 24 thus has to move horizontally in direction 34 to the front 20 to clear the way for the bogie 16 attachment as well as in direction 36 to the far rear 22. In a third position, the sliding running gear 24 is flush with the rear end 22 so that the container 14 backed against a loading dock for loading and unloading.

FIGS. 7-10 illustrate a running gear attachment 24 movable in horizontal 34, 36 and vertical 40, 42 directions. For example, the running gear 24 moves along the mainframe 18 at an angle relative to horizontal and, accordingly, the running gear 24 moves in vertical and horizontal directions, the advantages of which are described below.

Rules administered by the American Association of Railroads ("AAR Rules") require a three-inch gap between the tires 32 and the railway track 53. When in over-the-rail operation, bogies 16, not the running gear 24, bear the weight of the chassis 10 and its load. This causes the axles and tires 32 of the running gear 24 by their own weight to drop approximately two-and-one-half inches in the downward direction 42. To offset the two-and-one-half-inch drop, the running gear 24 moves, independent of the mainframe 18, in the upward direction 40. This provides the required three-inch gap between the tires 32 and the railway track 53 without moving the mainframe 18, and the entire chassis 10, in the upward direction 40 a corresponding distance to the movement of the tires in the direction 42. Accordingly, the chassis 10 remains stable when in over-the-rail operation because its center of gravity is not moved in the upward direction 40 to offset the movement of the tires 32 in the downward direction 42.

Referring now to the embodiment shown in FIGS. 7 and 8, the mainframe 18 includes a tapered beam 44 having top and bottom edges 45, 46. The tapered beam enables the running gear to slide in a first direction, which is up and toward the first end 20, and a second direction, which is down and toward the second end 22. The bottom edge 46 tapers at an angle of at least 1.0 degree from horizontal such that a first end 48 of the tapered edge 46 is higher than a second end 50. FIG. 7 illustrates the running gear 24 in an over-the-road position, and FIG. 8 illustrates the running gear 24 in a over-the-rail position. The chassis 10 includes receiver boxes 130 located on the first and second ends 20, 22 of the mainframe 18 for connecting to bogies 16, and the chassis 10 includes a king pin 58 for connecting to a fifth-wheel of a tractor 12.

As illustrated in FIG. 7, when in road mode, the running gear 24 is positioned in most rear position to meet all applicable bridge law requirements. In preparation for connecting the second end 22 of the chassis 10 to the bogie, the running gear 24 is slid along the bottom edge 46, toward the first end 20 of the mainframe 18. This moves the running gear 24 in the upward direction 40, relative to the mainframe 18, and raises the running gear 24 closer to the receiver boxes 130. This also moves the running gear 24 horizontally, in direction 34, thereby creating clearance 38 (see FIG. 4) at the second end 22 of the mainframe 18 for coupling to the bogie. The second end 22 is then pushed up the ramp 138 and the receiver box 130 connects to the bogie. Because the running gear has been lifted to a position close to the mainframe, as shown in FIG. 8, a gap 54 exist between the tires 32 and the rail when the chassis is connected to the bogie. This gap 54 is required so that the wheels do not interfere with the rail-required objects located and installed between the tracks. With the tapered beam 44, it is not necessary to have a device that mechanically lifts the axles and wheels of the running gear 24 for sufficient clearance. To disconnect the chassis from the bogie, the second end 22 is pulled down the ramp 138, and the running gear 24 is then slid in directions 36 and 42 along the bottom edge 46, toward the second end 22, as shown in FIG. 7.

Referring now to the embodiment shown in FIG. 9, the mainframe 18 includes a slider attachment 60 having first and second ends 62, 64. The slider attachment 60 includes a guide in which the running gear may slide in the first direction, which is up and toward the first end 20, and the second direction, which is down and toward the second end 22. The slider attachment 60 is attached to the mainframe 18 at an angle of at least 1.0 degree from horizontal such that the first end 62 is higher than the second end 64. The phantom lines illustrate the running gear 24 in an over-the-rail position. Otherwise, FIG. 9 illustrates the running gear 24 in an over-the-road position.

When in the road position, the first end 62 is near the second end 22 of the mainframe 18 and the tires 32 contact the road 52. When in the over-the-rail position, the first end 62 is near the second end 22 and a gap 54 exists between the tires 32 and the rail.

To connect the chassis 10, as shown in FIG. 9, to the bogie 16, the running gear 24 is slid along the guides in the slider attachment 60, toward the first end 20 of the mainframe 18. Similar to the sliding the running gear along the bottom edge 46 of the tapered beam 44, this moves the running gear 24 in the upward direction 40, closer to the mainframe 18. This also moves the running gear 24 horizontally, in direction 34, so as to create the clearance 38. Because the running gear has been lifted, like the chassis of FIG. 8, gap 54 exists between the tires 32 and the road 52 when the chassis is suspended between bogies. To disconnect the chassis 10, the second end 22 is pulled down the ramp 138, and the running gear 24 is then slid, in the guides of the slider attachment 60, toward the second end 22.

Referring now to the embodiment shown in FIG. 10, a moveable swing slider 70 is provided. The phantom lines illustrate the running gear 24 and the swing slider 70 in an over-the-rail position. Otherwise, FIG. 10 illustrates the running gear 24 and the swing slider 70 are in an over-the-road position. The swing slider 70 includes first and second linkage arms 72, 78. Linkage arm 72 has first and second ends 74, 76, and second linkage arm 78 has first and second ends 80, 82. Linkage arm 72 is pivotally attached to the mainframe 18 at pivot location 84, and second linkage arm 78 is pivotally attached to the mainframe 18 at pivot location 86. First arm 72 is movable between first and second fastening positions 88, 90, and second arm 78 is movable between first and second fastening positions 92, 94.

When the swing slider 70 transitions from road to rail positions, a hydraulic system (not shown) moves first arm 72 about location 84 from the first position 88 to the second position 90, and the hydraulic system moves second arm 78 about location 86 from the first 92 to the second position 99. The running gear 24 transitions in a corresponding manner relative to the swing slider 70. Accordingly, when the swing slider 70 transitions from road to rail positions, the running gear 24 transitions, independent of the mainframe 18, in both directions 34 and 40, thereby creating a clearance 38 between the running gear 24 the second end 22 of the mainframe 18 for connecting to a bogie 16 and providing the required gap 54 between the tires 32 and the railway track.

It should be appreciated that all features and embodiments described with reference to FIGS. 7-10 can be used with all types of chassis, e.g., heavy or light loaded types and twenty foot, forty foot, forty-five foot, and fifty-three foot types.

In an embodiment, as shown in FIGS. 11 and 12, the chassis 10 includes an air-activated locking-pin device 61 connected to a push-button 63. The locking device 61 maintains the brakes in an engaged position when the chassis 10 is in rail mode. However, the locking device 61 remains unlocked in road mode, including when the chassis transitions from road to rail mode. Accordingly, during this transition, the driver locks the rear brakes from the cab of the tractor. The driver also releases securing bolts, which keep the repositionable running gear 24 in the road position. After releasing the securing bolt and locking the rear brakes, the driver backs the tractor. This pushes the chassis 10 in direction 36, toward the bogie 16.

As the chassis 10 moves, the normal force from the weight of the chassis 10 combined with the coefficient of friction between the locked tires 32 and the surface create a resulting force of a magnitude sufficient to cause the running gear 24 to remain stationary as the chassis continues to move toward the bogie 16. Accordingly, the running gear slides in direction 34 relative to the chassis 10. The second end 22 moves up the ramp 138 of the bogie, and the tongue 132 enters the opening of the receiver box 130 and contacts the push-button 63, as shown in FIG. 11. The push-button 63 can be a plunger-piston device, which, upon actuation, moves into contact with and switches on a two-way pneumatic valve 65, which locks the brakes. The brakes are now lock until the gear 24 is returned to road mode.

Conversely, when changing from rail to road mode, the tractor pulls the chassis 10 in direction 34, down the ramp 138 and away from the bogie 16. This disengages the tongue 132 from the push-button 63, but the two-way pneumatic valve 65 and the brakes remain engaged. As the tractor pulls the chassis 10 away from the bogie 16, friction causes the running gear 24 to slide in direction 36, to the rear end 22 of the chassis. This repositioning of the running gear prevents the chassis 10 from tipping when it disengages the bogie 16 due to lack of support at its rear end 22. When the running gear 24 reaches the road position, a handle 69, which is attached to the running gear, pushes the plunger-piston device 63 in the opposite direction, as shown in FIG. 12. This deactivates the two-way pneumatic valve 65 and releases the brakes.

Referring now to the embodiment shown in FIG. 13, a securing device 100 is applied to prevent the suspension components 26 from decompressing or hanging down by their own weight when the chassis 10 is in over-the-rail operation and, as such, when bogies 16, not the running gear 24, bear the weight of the chassis 10. The securing device 100 includes U-rings 102 and corresponding clamps 104 for securing the axle 28 to the mainframe 18, thereby preventing the axle 28 and other suspension components 26 from moving beyond a predetermined distance in direction 42.

FIG. 14 illustrates advantages provided by the securing device 100 when the chassis 10 is in over-the-rail operation. Phantom lines illustrating the position of the tires 32 when the securing device 100 is not applied are superimposed over regular lines illustrating the position of the tires 32 when the securing device 100 is applied to prevent the suspension components 26 from decompressing and hanging down.

As shown in FIG. 14, the securing device 100 prevents the tires 32 from moving approximately two-and-one-half inches downward in direction 42. Accordingly, the device 100 helps provide the required three-inch gap 54 between the tires 32 and the rail 53, without moving the mainframe 18 in the direction 40. Without the securing device 100, as illustrated by the phantom lines, the tires 32 would drop in the direction 40, thereby compromising the required three-inch gap 54 between the tires 32 and the railway track 53. Without the securing device 100 to offset movement of the tires 32 in the direction 42, the mainframe would have to be raised higher up in the direction 40, thereby decreasing the stability of the chassis 10. Because of the securing device 100, the chassis 10 is more stable when in over-the-rail operation because its center of gravity is not moved in the direction 40 to offset the movement of the tires 32 in the direction 42. It should be appreciated that, in the embodiments of FIGS. 7-10, the gap 54 exists without application of the device 100.

In an embodiment, the securing device 100 can be made from a high-tensile strap allowing the axle to move freely when in over-the-road operation and in extreme traffic conditions without giving up the limiting capability for the suspension to hang down when the suspension is decompressed. In this embodiment, the device 100 is provided in both rail and road modes and does not require adjusting.

Figure 15:
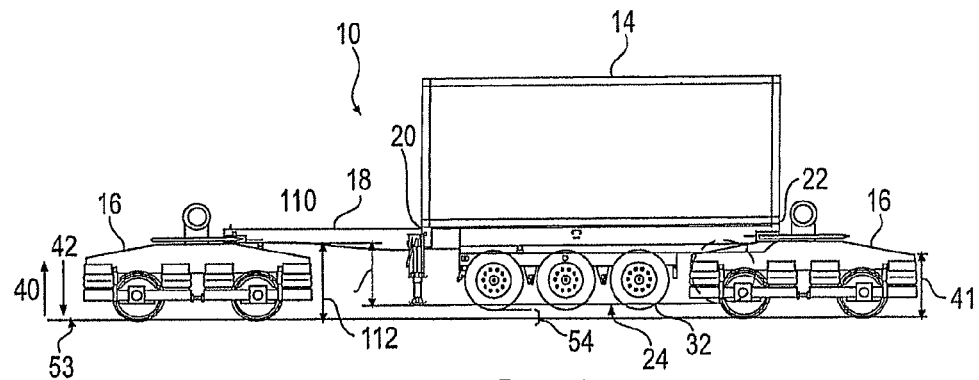
FIG. 15 is a side view of an embodiment of the bimodal container chassis transporting a container in over-the-rail operation and having a king-pin height of forty-two inches.

Referring now to the embodiment shown in FIG. 15, for example the twenty-foot chassis 10 has a lower king-pin height 110 of forty-two inches. This is advantageous because it provides the required three-inch gap 54 between the tires 32 and the railway track 53 while being pushed up the ramp 138 of the bogie 16 without requiring additional moving of the mainframe 18 in the direction 40, thereby maintaining overall stability of the chassis 10 while in over-the-rail operation. Thus the bogie 16 can be designed in such a way that the draw bar height 41 can be lowered and the center of gravity is reduced.

Figure 16:
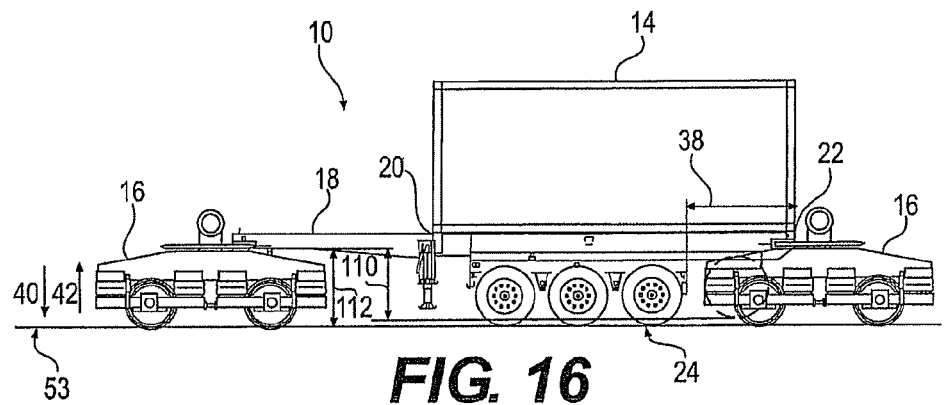
FIG. 16 is a side view of an embodiment of the bimodal container chassis transporting a container in over-the-rail operation and having a king-pin height of forty-eight inches.

Advantages of the chassis 10 having a king-pin height 110 of forty-two inches, as shown in FIG. 15, can be understood by comparing it with the chassis 10 having a king-pin height 110 of forty-eight inches, as shown FIG. 16. Both chassis 10 have equal distances 112 between the mainframe 18 and the railway track 53 and, accordingly, both are equally stable. However, the chassis 10 having a king-pin height 110 of forty-eight inches, as shown FIG. 16, does not provide the required gap 54. Accordingly, the chassis 10 having a king-pin height 110 of forty-two inches is suitable for rail transit without additional modification, but the chassis 10 having a king-pin height 110 of forty-eight inches must be raised in direction 40 to provide the required three-inch gap 54, causing it to be less stable in rail transit. Also, raising the chassis in the direction 40 requires expensive equipment. For example, the bogie 16 would have to be equipped with air shocks capable of raising the chassis 10 in the direction 40, adding an expense. Accordingly, the chassis 10 of FIG. 15 eliminates the need of equipping the bogies 16 with expensive air shocks.

Other advantages of the chassis 10 having a king-pin height 110 of forty-two inches and a level mainframe 18, as shown in FIG. 15, can be understood by comparing it with the chassis, FIG. 15, having a king-pin height 110 of forty-eight inches and a gooseneck 17. This forty-eight inch king-pin height determines the location of the receiver box 130 because the box has to fit between the main beams 180 and under the bolsters and in the gooseneck carrying container. The chassis of FIG. 4, when connected between bogies 16, is angled at 1.1 degrees relative to horizontal, which is not desirable. However, the chassis 10 of FIG. 15, when connected between bogies 16, is angled between 0 and 0.4 degree from horizontal. To remain level during rail transit, the chassis of FIG. 4 has to be connected between bogies having two connecting tongues of different height to compensate for the difference in height between the front and rear centerline of the receiver boxes of the chassis. These bogies are expense. The chassis of FIG. 15, however, does not require connection to such bogies. Additionally, as the difference in the centerline between the front and the rear receiver boxes reaches zero, or not more than two inches, as shown in FIG. 15, the longitudinal forces and bending moments acting on the mainframe 18 are significantly reduced. This allows reductions in the height, flange thickness, and web thickness of the main beams 180 of the mainframe 18.

Figure 17:
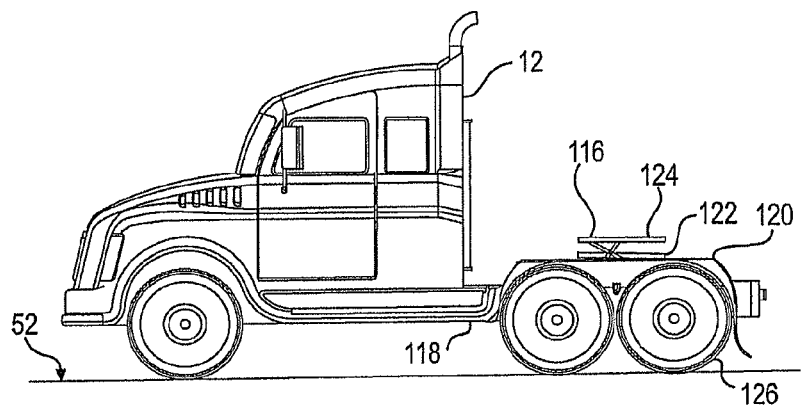
FIG. 17 is a side view of a tractor having an adjustable fifth wheel for use with an embodiment of the bimodal container chassis.

FIG. 17 illustrates a tractor 12 having an adjustable fifth wheel 116 for use with the chassis 10. The tractor 12 includes a chassis 118 having a top-portion 120 positioned approximately forty-two inches above the road surface 52. The tractor 16 includes a supporting frame, which is lower than normal tractors, and tires 126 having a smaller diameter than tires typically used on tractors. The adjustable fifth wheel 116 is movable between a position 122 located approximately forty-two inches above the road 52 and a position 124 located approximately forty-eight inches above the road 52, which is today's standard for tractors moving container chassis. It will be appreciated that the adjustable fifth wheel 116 can be movable to positions other than positions 122 and 124. The tractor 12 of FIG. 17 is useful for transporting the chassis 10 of FIG. 15, which has a king-pin height 110 of forty-two inches. Moreover, the chassis 10 having a king-pin height 110 of forty-two inches enables a straight-beam design instead of a gooseneck design when transporting container 14 having a height of nine and one-half feet over the road.

A receiver box 130, as shown in FIG. 4, may be incorporated at both ends 20, 22 of the chassis 10, and, correspondingly, both halves 134, 136 of the bogie 16 may be fitted with a tongue 132. The tongue 132 couples to the receiver box 130, thereby coupling the bogie 16 and the chassis 10 for over-the-rail operation. Having a receiver box 130 on both ends 20, 22 eliminates the need for having a tongue extending from at least one end 20, 22 of the chassis 10, thereby reducing the overall length of the chassis 10. Additionally, having a receiver box 130 disposed at both ends 20, 22 of the chassis 10 and a tongue 132 disposed at both halves 134, 136 of the bogie 16 provides a symmetrical coupling system. Accordingly, during train-coupling operations, either end 20, 22 of the chassis 10 can be coupled to either half 134, 136 of the bogie 16.

Train-coupling operations can be accomplished in the following manner. Initially a hand brake on the bogie 16 is engaged, and an end 20 or 22 of the chassis 10 is pushed onto either half 134 or 136 of the bogie 16. During this operation, the receiver box 130, which is centrally-located on each respective end 20, 22 of the main frame 18, contacts and slides up a flared loading ramp 138, which is located on either half 134, 136 of the bogie 16, and couples with the tongue 132. It should be appreciated that the bogie 16 can be equipped with a rubber or plastic bumper 71 (see FIG. 8) attached to the rear and front of its main cross beam. The bumper pushes the running gear 24 to the rail position as the chassis 10 is pushed up the ramp 138. Once in the rail position, the running gear 24 is automatically secured by laterally directed securing pins, which are spring supported for pushing the pins in predetermined holes.

As illustrated in FIG. 18, the receiver box 130 located at the second end 22 of the chassis 10 may include rollers 144 for reducing friction when it slides up ramp 138 of the bogie 16. It should also be appreciated that the receiver box 130 located on the first end 20 of the chassis 10 may include rollers. FIG. 19 is a perspective view of an embodiment of the receiver box 130. The receiver box includes a top and bottom plate 129, 131. The top plate 129 includes an opening 127 and the bottom plate 131 includes an opening 128. The plates 129, 131 are spaced apart such that the tongue 132 of the bogie 16 can fit therebetween. The receiver box 130, for example, can be fabricated of high tension steel such as T1, StE690, or Weldox 700 with a yield stress of 100 ksi or 690 mpa.

As illustrated in FIG. 20, the receiver box 130 can include support members 160, 162, 163, 164, 166. The support members 160, 162, 163, 164, 166 have an equal height 168 so as to maintain a consistent spaced relationship between the top and bottom plates 129, 131. Additionally, support members 164 and 166 are disposed at guidance angles θ, as shown in FIG. 20, that substantially correspond with the angle Φ, as shown in FIG. 23, at which portions 170, 172 of the tongue 132 are disposed. Accordingly, as shown in FIG. 24, the support members 164 and 166 combine to guide the tongue 132 into the receiver box 130. Once the tongue 132 is in the receiver box 130, as shown in FIG. 25, a connecting pin (not shown) is disposed through the opening 127 in the top plate 129, an opening 159 in the tongue 132, and the opening 128 in the bottom plate 131, thereby securing the chassis 10 to the bogie 16.

In some train-coupling instances, rollers may be disadvantageous. For example, if rollers were located on each side of the receiver box 130, a wider bogie ramp 138 may be required to accommodate the distance between the rollers. This wider ramp 138 may interfere with the train operations. Accordingly, as illustrated in FIG. 21, the receiver box 130 includes a sliding pad 143, instead of rollers, for reducing friction between the receiver box 130 and the ramp 138. The pads 143 can be constructed of a wearing material that is dissimilar to the material of the ramp 138, and the pads 143 can be removably connected via screws 145 that are recessed into the pad 143 so as to not contact the ramp 138. For example, the sliding pad may be made of T1 steel, stainless steel AISI 316 or leaded tin bronze CuSn7ZPb. The pad may also be made of aluminum bronze with a given hardness of 170 HB and a yield stress of 32 Ksi as well as material combination of CuAl10Fe3 (83% Cu; 7% Pb; 6.7% Sn; 3% Zni).

In addition to reducing noise, pads 143 reduce friction forces by up to 29% and eliminate the need for grease, thereby reducing time and labor, as well as preventing grease from dripping between the track and contaminating the environment. Because of the small geometry of the pads 143, the bogie 16 can be fitted with a relatively narrow ramp 138, thereby reducing the weight and cost of the bogie 16. For example, the small geometry of the pads 143 is suitable for use with the ramp 138 having a triangular shape for supplying guidance to the chassis 10 via the mainframe 18. The pads 143 consume most of the wear and tear, instead of the receiver box, during train-coupling operations. This is advantageous because pads cost less than the receiver box and can be easily replaced.

Additionally, pads 143 address safety concerns because, even when the ramp 138 is amply greased, without pads 143, friction forces between the receiver box 130 and the ramp 138 can be difficult to overcome, which can cause the bogie 16, despite its engaged hand break, to move as the second end 22 of chassis 10 is pushed onto ramp 138. This movement of the bogie may prevent the chassis 10 from sliding up the ramp 138 and may cause the chassis 10 to fall to the track, causing damage and injury to nearby workers.

Figure 26:
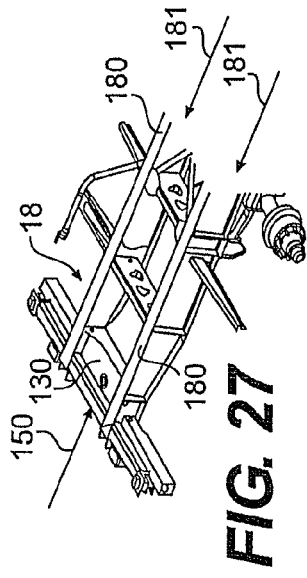
FIG. 26 is a perspective view of a mainframe of an embodiment of the bimodal container chassis indicating forces acting on the mainframe during operation.

FIG. 26 illustrates forces that occur during over-the-rail operations and how the forces act on the mainframe 18. To be suitable for over-the-rail operation, the mainframe 18 is designed to withstand longitudinal loads 150 resulting from train forces, a vertical load 152 resulting from the weight of the container 14 including its payload, a lateral force 154, and a roll force 156. The mainframe 18 is a unique design suitable for over-the-rail operations and for over-the-road operations. In over-the-road operation, the mainframe 18 is light enough in weight to comply with highway laws and fuel efficiency concerns. That is, if the mainframe 18 were too heavy, the payload would have to be reduced and thus the design would be less competitive than normal container chassis. In over-the-rail operation, the mainframe 18 is of sufficient strength to withstand the weight of its own payload in addition to in-train forces of up to 400,000 pounds. Accordingly, the disclosed mainframe 18 is light enough in weight for over-the-road operation, yet strong enough to withstand train forces for rail operation.

Figure 27:
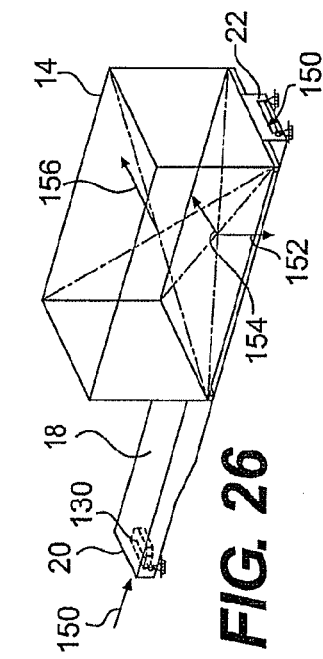
FIG. 27 is a fragmentary perspective view of a mainframe of an embodiment of the bimodal container chassis indicating compression forces acting on the mainframe during operation.

During rail operations, longitudinal loads 150 resulting from train forces act on the receiver box 130 located at each end 20, 22 of the mainframe 18. In an embodiment, the longitudinal loads 150 are transferred through the connecting pin (not shown) that is disposed through the opening 127 in the top plate 129, the opening 159 in the tongue 132, and the opening 128 in the bottom plate 131. As shown in FIG. 27, the receiver box 130 distributes the longitudinal loads 150 to the main beams 180 of the mainframe 18, thereby creating reaction forces 181. The sum of the reaction forces 181 is substantially similar in magnitude to the longitudinal load 150 when only the longitudinal load 150 is acting on the receiver box 130. However, the sum of reaction forces 181 may exceed the magnitude of the longitudinal load 150 when other forces, in addition to the longitudinal force 150, act on receiver box 130.

Figure 28:
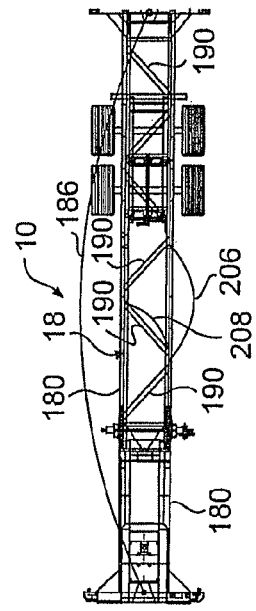
FIG. 28 is a fragmentary perspective view of the mainframe of FIG. 27 indicating tension forces acting on the mainframe during operation.

The forces 150 and 181, as shown in FIG. 27, place the mainframe 18 in compression. As shown in FIG. 28, it will be appreciated that forces 150 and 181 can reverse in response to forces shifting throughout the train, thereby placing the mainframe 18 in tension. Accordingly, the longitudinal force 150 and the corresponding reaction forces 181 can be considered in two ways: compression and tension. It should be appreciated that compression and tension can be referred to as buff and draft. The mainframe 18 is designed such that, when it is in tension, the tensile stress does not exceed the safety limit of the yield stress of the material. In addition, the mainframe 18 is designed such that, when it is in compression, the compression stress does not exceed the safety limit of the yield stress of the material.

Figure 29:
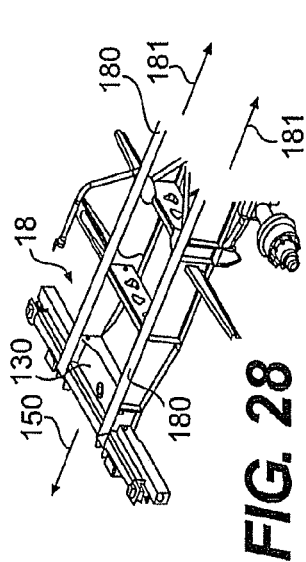
FIG. 29 is a top view of an embodiment of the bimodal container chassis having a gooseneck mainframe and illustrating buckling modes.
Figure 30:
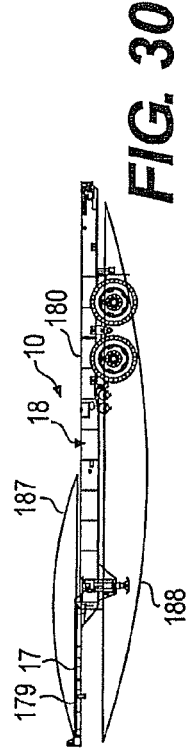
FIG. 30 is a side view of an embodiment of the bimodal container chassis having a gooseneck mainframe and illustrating buckling modes.

Furthermore, when in compression, a safety limit of the buckling stress must be considered because beam-like members loaded in compression may bend. When the mainframe 18 is loaded in compression, global buckling of the entire mainframe 18 may occur, and local buckling throughout the mainframe 18 may occur. Global buckling of the entire mainframe 18 can be divided into at least three modes: horizontal, vertical, and local buckling. FIG. 29 illustrates a horizontal global buckling mode 186 and FIG. 30 illustrates vertical global buckling modes 187 and 188.

Horizontal global buckling mode 186 is the result of shear forces created when the mainframe 18 is in compression. The shear forces, acting in a multiplicity of directions, create a bending moment. The magnitude of the bending moment is the product of the forces acting on the mainframe 18 and the unsupported length of the mainframe 18. Accordingly, to prevent horizontal global buckling 186, the present embodiment includes diagonal bracings 190 that connect the main beams 180 at various locations along the horizontal length of the mainframe 18. The diagonal bracings 190 reduce the magnitude of the bending moment acting on the mainframe 18 by distributing the shear forces between the main beams 180 in a manner that prevents the mainframe 18 from horizontal global buckling 186.

Vertical global buckling modes 187 and 188 occur when the mass inertia of the main beam 180 or the mass inertia of the gooseneck beam 179 is not sufficient to withstand the compression stresses. Accordingly, to prevent vertical global buckling modes 187 and 188, the mass inertia of the main beam 180 and, if the mainframe 18 has a gooseneck design, the gooseneck beam 179, must have a mass inertia of sufficient magnitude. Referring now to FIG. 31, a cross-sectional view of the main beam 180 is provided. The mass inertia of the main beam 180 is directly proportional to the thicknesses 193, 194 of the flanges 191, 192 and the overall height 198 of the main beam 180. As such, the mass inertia increases correspondingly with the thicknesses 193, 194 of the flanges 191, 192 and the overall height 198. However, increasing the thicknesses 193, 194 of the flanges 191, 192 and increasing the overall height 198 of the main beam 180 adds additional weight to the chassis 10, rendering it less suitable for over-the-road transit.

Local buckling can be divided into at least five modes. FIG. 26 illustrates flange buckling mode 202, FIG. 27 illustrates web buckling mode 203, FIG. 28 illustrates tip buckling mode 210, and FIG. 23 illustrates local main-beam buckling mode 206 and bracing buckling mode 208. As shown in FIG. 32, flange buckling mode 202 occurs in both the upper and lower flanges 191, 192 and causes the entire main beam 180 to lose its strength. Flanges 191, 192 are susceptible to flange buckling mode 202 because very little surface area of the flanges 191, 192, respectively, is connected to the edges 200 of the web 196. The allowable buckling stress of the flanges 191, 192, respectively, can be optimized by properly adjusting the flange thicknesses 193, 194 and the flange widths 195, 197, as shown.

As shown in FIG. 33, web buckling mode 203 occurs in the web 196, which interconnects the upper and lower flanges 191, 192 to create an I-beam-type main beam 180. When the main beam 180 is placed in compression, a bending moment is created and shear stress acts across the web 196 between the upper and lower flanges 191, 192. Because a bending moment is applied, tensile stresses and compressive stresses concurrently act on the web 196, causing an array of stresses to disperse throughout the web 196. These multiple stresses can cause web buckling mode 203. The allowable buckling stress of the web 196 can be optimized by properly adjusting the web thickness 199, the web height 201, the unsupported length of the web, and the stress ratio, as shown.

Tip buckling mode 210, as shown in FIG. 34, occurs in the web 196 and one of the flanges 191, 192. Tip buckling mode causes the web 196 and the affected flange 191 or 192, usually the upper flange 191, to rotate in response to torsion. For example, as shown in FIG. 34, the upper flange 191, which is in compression, buckles and rotates while the lower flange 192, which is in tension, remains straight. To prevent tip buckling mode 210, the stiffness of the main beam 180 must be of a sufficient magnitude. For example, a main beam in the shape of a tube or an asymmetrical I-beam will have a torsion stiffness of a sufficient magnitude to prevent tip buckling.

As shown in FIG. 29, local main beam buckling mode 206 occurs in a portion of the main beam 180. It will also be appreciated that local main beam buckling mode 206 can occur in a portion of the gooseneck beam. For example, as illustrated in FIG. 29, local main beam buckling mode 206 occurs in a portion of the main beam 180 between two bracings 190. Similar to horizontal global buckling mode 186, local main beam buckling mode 206 is the result of shear forces created when the mainframe 18 is in compression. The shear forces, acting in a multiplicity of directions, create a bending moment. The magnitude of the bending moment is the product of the forces acting on the mainframe 18 and the unsupported length of the mainframe 18. Accordingly, to prevent local main beam buckling mode 206, the present embodiment includes diagonal bracings 190 that connect the main beams 180 at various locations along the horizontal length of the mainframe 18. The diagonal bracings 190 are spaced along the horizontal length of the mainframe 18 in a manner that limits the length of the unsupported portions of the main beam 180 between two bracings 190. Local main beam buckling mode 206 is less likely to occur in a mainframe 18 have short lengths of unsupported portions of the main beam 180.

Bracing buckling mode 208, which is also shown in FIG. 29, occurs in the bracings 190 and is the result of shear forces created when the bracings 190 are in compression. The shear forces, acting in a multiplicity of directions, create a bending moment causing bracing buckling mode 208 to occur in the bracings 190. The magnitude of the bending moment acting on any one bracing 190 is proportional to the number of bracings 190 connected at locations along the horizontal length of the mainframe 18. To prevent bracing buckling mode 208, the present embodiment includes a sufficient number of bracings 190, thereby reducing the magnitude of the bending moment acting on any one bracing 190. Moreover, the mainframe 18 includes bracings 190 having a sufficiently large yield stress to prevent the occurrence of bracing buckling mode 208.

Referring now to FIG. 35, an embodiment of the main beam 180 is illustrated. The main beam 180 is designed to prevent all modes of global buckling and all modes of local buckling during over-the-rail operations, yet the main beam 180 is light enough in weight that is suitable for over-the-road operations. The main beam 180 has an asymmetrical design that includes a flange 191, 192 having a greater thickness 193, 194 than the other flange. In the illustrated embodiment, the upper flange 191 has a greater thickness 193 than the thickness 194 of the lower flange 192. Accordingly, main beam 180 of FIG. 35 has a greater mass inertia and is less susceptible to global vertical buckling modes 186, 187 than the traditional main beam shown in FIG. 31. It will also be appreciated that the overall height 198 of the embodiment illustrated in FIG. 35 may be greater than the overall height 198 of the embodiment illustrated in FIG. 31, and, accordingly, the embodiment of FIG. 35 has a greater mass inertia and is less susceptible to global vertical buckling modes 186, 187. While the main beam 180 of FIG. 29 has a mass inertia large enough to prevent global buckling modes 186, 187, the weight of the main beam remains suitable for over-the-road transit because the thickness 194 of the lower flange 192 remains relatively small. The asymmetric flanges 191, 192 reduce bending and deflection and increase beam stiffness.

The asymmetrical design also reduces the natural frequency at which the main beam swings in a vertical direction during rail transit. When supported at the first 20 and second ends 22, the chassis 10 has a tendency to swing up and down based on its inherent modular frequency. This frequency may be stimulated through regular impulse when the chassis 10 is in over-the-rail operation and is passing over track connections or passing over the track in natural sinus curves. If both the riding frequency and the natural frequency are superimposing on each other, the vertical movement can become so great that the chassis 10, the container 14, and bogie 16 derail. Accordingly, the upper and lower flanges 191, 192 are dimensioned in such a way that the frequency of the main beam 180 never corresponds to the train riding frequency. In an embodiment, the main beam 180 has a height 201 of at least fourteen inches, a flange thickness 193, 194 in the range of one-half inch to one inch, a flange width 195, 197 in the range of four to six inches. The flanges 191, 192 may have a given ratio The main beam 180 of a twenty-foot chassis 10 may have a minimum height of fourteen inches, the main beam 180 of a forty-foot and a forty-five-foot chassis 10 may have a minimum height of sixteen inches, and the main beam 180 of a fifty-three-foot chassis 10 may have a minimum height of seventeen inches.

Referring now to FIG. 36, an embodiment of the main beam 180 is illustrated. Like the asymmetrical I-beam of FIG. 35, the main beam 180 of FIG. 36 is designed to prevent all modes of global buckling and all modes of local buckling from occurring during over-the-rail operations, yet the main beam 180 is light enough in weight that is suitable for over-the-road operations. As shown in FIG. 36, the main beam 180 is a hollow beam having four sides 214, 216, 218, 220. In the illustrated embodiment, sides 214, 216, 218, 220 have substantially similar thicknesses and heights and are connected to each other at substantially right angles. It will be appreciated that sides 214, 216, 218, 220 can have varying thicknesses and are connected to each other at oblique angles.

Figure 37:
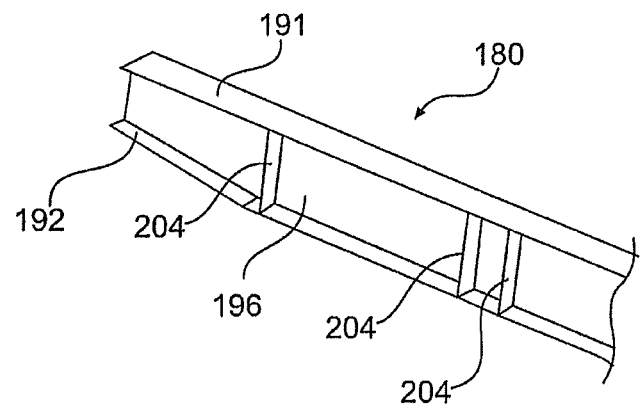
FIG. 37 is a fragmentary perspective view of an I-beam having vertical stiffeners for use in a mainframe of an embodiment of the bimodal container chassis.

Referring now to FIG. 37, an embodiment of the main beam 180 is illustrated. The main beam 180 of FIG. 37 is also designed to prevent all modes of global buckling and all modes of local buckling during over-the-rail operations, yet the main beam 180 is light enough in weight that it is payload competitive in over-the-road operations. As shown in FIG. 31, the main beam 180 includes vertical stiffeners 204 to increase the local buckling strength of the web 196. The vertical stiffeners 204 are provided at intermittent or consistent locations along the horizontal length of the web 196. The vertical stiffeners 204 can extend along the entire distance between the upper and lower flanges 191, 192 and may be located at each change of height of the beam or change in material thickness of the web and beam flanges. It will be appreciated that the main beam 180 can be constructed of ultra-high tensile steel having a tensile strength of 80,000 pounds up to 150,000 pounds. It will also be appreciated that the main beam 180 can have chamfered ends reducing weight and improving clearance to the ramp 138 of the bogies 16.

Figure 38:
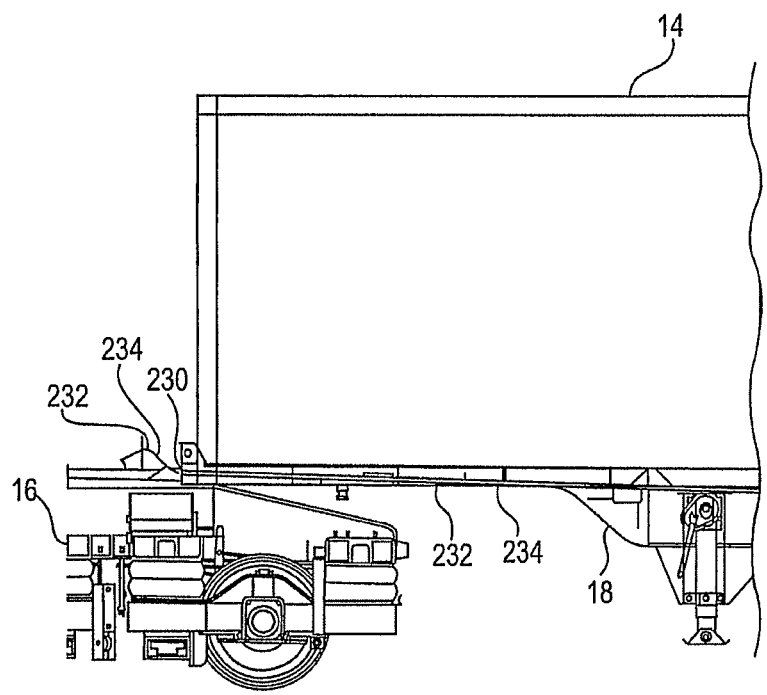
FIG. 38 is a fragmentary side view of an embodiment of the bimodal container chassis having a male-female coupler.

Referring to FIG. 38, the chassis 10 includes a female coupling socket 230 formed in the first and second ends 20, 22, and the bogie 16 includes male couplers provided on both halves 134, 136. The female sockets and male couplers automatically interconnect when the chassis 10 connects to the bogie 16, thereby connecting air tubes 232 and electrical cables 234 between the chassis 10 and the bogie 16. It will be appreciated that the female coupling socket 230 and the male coupler can concurrently couple multiple air tubes 232 and multiple electrical cables 234. Multiple female coupling sockets 230 and male couplers, one at every chassis-bogie connection, combine to seamlessly transmit air pressure and electricity across the entire length of the train, e.g., a train having a length of up to 8,475 feet. The electrical cables 234 are configured to transmit a varying range of voltage. For example, the electrical cables 234 can be configured to transmit twelve volts or more, and it should be appreciated that the electrical cables 234 can be configured to transmit less than twelve volts. Similarly, the air tubes 232 are configured to transmit a varying range of air pressure. For example, the air tubes 232 can be configured to transmit 110 pounds-per-square-inch or more, and it should be appreciated that the air tubes 232 can be configured to transmit less than 110 pounds-per-square-inch.

Because the air tubes 232 and electrical cables 234 transition the entire horizontal length of each chassis 10 and bogie 16 within the train, the air tubes 232 and electrical cables 234 are susceptible to damage. To prevent damage, the air tubes 232 and electrical cables 234 extend the horizontal length of each chassis 10 in a protected manner. For example, in an embodiment of the chassis 10 having a hollow main beam 180, as shown in FIG. 36, the air tubes 232 and electrical cables 234 transition through the section of the main beam 180. Because the air tubes 232 and electrical cables 234 transition inside the hollow main beam 180, the air tubes 232 and electrical cables 234 are protected from damage. Alternatively, in an embodiment of the chassis 10 having an I-beam type main beam 180, the air tubes 232 and the electrical cables 234 can be secured to an inside portion of a flange. Referring to FIG. 35, where an asymmetrical I-beam type main beam 180 is shown, the air tubes 232 and electrical cable 234 can be secured proximate to the intersection of the web 196 and one of the flanges 191, 192. Accordingly, because the air tubes 232 and the electrical cables 234 remain protected by the main beam 180, they are less susceptible to damage.

When the chassis 10 is in over-the-rail operation, bogies 16 provide braking for the entire train. Bogies 16 of the present disclosure may have air brakes, and it will be appreciated that bogies 16 of the present disclosure can be adapted to have electrical brakes. A locomotive can supply the air pressure via the air tubes 232 and electricity via the electrical cables 234 for powering both electrical and air brakes. It will be appreciated that, in addition to powering electrical brakes, the electricity can power lights, control signals, tracking systems, door locks, and other electrical components located on the chassis 10 and the bogie 16. It will be appreciated that bogies can include axle generators and batteries. The batteries can supply electricity to power the electrical brakes and other electrical components. And, while the chassis 10 and the bogies 16 are in operation, the axle generator can automatically charge the batteries.

The use of the terms "a" and "an" and "the" and similar referents in the context of describing the disclosures are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosed bimodal container chassis.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure is intended to include all modifications and equivalents of the subject matter herein as permitted by applicable law. Moreover, any combination of the above-described elements in all possible variations thereof is encompassed by the disclosure unless otherwise indicated herein or otherwise clearly contradicted by context.

The invention claimed is:

1. A bimodal container chassis for supporting a container during roadway and railway transit, the chassis comprising:
   a mainframe having first and second ends, a top edge and a bottom tapered edge, the bottom tapered edge positioned at an acute angle from horizontal such that a first end of the tapered edge, which is oriented towards the first end of the mainframe, is higher than a second end of the tapered edge, which is adjacent the second end of the mainframe; and
   a running gear attachment connected to the mainframe and slidable along the bottom tapered edge in first and second directions between an over-the-road position and an over-the-rail position;
   wherein the first direction is upward and toward the first end of the mainframe, and the second direction is downward and toward the second end of the mainframe such that the running gear attachment is disposed adjacent the second end when in the over-the-road position and disposed upward relative to the over-the-road position and toward the first end when in the over-the-rail position.

2. The chassis of claim 1, wherein the bottom edge of the mainframe is a flat inclined surface.

3. The chassis of claim 2, wherein the mainframe has a beam that tapers upward from the second to the first end, the beam forming the top edge and the bottom edge.

4. The chassis of claim 3, wherein the beam has a web that extends between the top and bottom edges, the web being tapered from the first to the second end.

5. The chassis of claim 4, wherein the top and bottom edges are flanges with the web extending therebetween.

6. The chassis of claim 5, wherein the running gear attachment is slidable along the bottom flange in the first and second directions.

7. The chassis of claim 1, wherein the running gear attachment comprises a wheel attached to an axle, a tire arranged around the wheel, and a brake.

8. The chassis of claim 7, wherein the running gear attachment is movable in the first direction to the over-the-rail position for rail transit and in the second direction to the over-the-road position for road transit.

9. The chassis of claim 8, wherein the over-the-rail position is characterized by a gap between the tire and the railway and a clearance under the mainframe at the second end, and the mainframe connects to a bogie at the clearance for supporting the chassis during railway transit.

10. The chassis of claim 8, wherein the over-the-road position is characterized by the tire being in contact with the roadway and the running gear attachment located at the second end of the mainframe for supporting the chassis during roadway transit.

11. The bimodal container chassis of claim 8, further comprising: a locking device configured to automatically maintain the brake of the running gear attachment in an engaged position when the running gear is in the over-the-rail position.

12. The chassis of claim 11, wherein the locking device further comprises: a valve located at the second end of the mainframe and configured to engage the brake of the running gear attachment when the chassis connects to a bogie.

13. The chassis of claim 12, wherein the locking device further comprises: a push-button located in a receiver box that is incorporated in the second end of the mainframe, the push-button configured to activate the valve when contacted by a tongue of the bogie.

14. The bimodal container chassis of claim 13, wherein a handle is located on the running gear attachment and configured to contact the push-button when the running gear attachment slides in the second direction and reaches the over-the-road position, the contact causes the locking device to deactivate the valve, which releases the brake of the running gear attachment.

15. The chassis of claim 8, further comprising: a securing device configured to prevent the axle from dropping when the running gear attachment is in the over-the-rail position.

16. The chassis of claim 1, further comprising: a receiver box incorporated in the first and second ends of the chassis for engaging a rail bogie, the receiver box comprising: an opening for receiving a tongue of the rail bogie, and a sliding pad for reducing friction between the chassis and a surface of the rail bogie.

17. The chassis of claim 1, further comprising an air line extending from the first end to the second end of the mainframe and configured to transmit compressed air from a bogie connected to the first end to a bogie connected to the second end.

18. The chassis of claim 1, further comprising an underride guard connected to the second end of the mainframe and moveable between over-the-road and over-the-rail positions.

19. The chassis of claim 18, wherein the over-the-rail position of the underride guard is above the mainframe and the over-the-road position of the underride guard is below the mainframe, and wherein the chassis further comprises first and second gravity latches connected the second end of the mainframe for automatically coupling with a pin extending from the underride guard, wherein the first gravity latch couples with the pin when the underride guard is in the over-the-rail position and the second gravity latch couples with the pin when the underride guard is in the over-the-road position.

20. The chassis of claim 18, wherein the underride guard is slidable along the bottom tapered edge of the mainframe, wherein the over-the-road position of the underride guard is adjacent the second end of the mainframe, and wherein the over-the-rail position of the underride guard is adjacent the over-the-rail position of the running gear attachment.

* * * * *